(12) United States Patent
Murakami et al.

US007001638B2

(10) Patent No.: US 7,001,638 B2
(45) Date of Patent: *Feb. 21, 2006

(54) USE OF GLYCOSIDES EXTRACTED FROM HOP PLANT PARTS TO FLAVOR MALT BEVERAGES

(75) Inventors: Aki A. Murakami, Mequon, WI (US); Alfonso Navarro, Valencia (ES); David S. Ryder, Mequon, WI (US); Henry Goldstein, Tucson, AZ (US)

(73) Assignee: Miller Brewing Company, Milwaukee, WI (US)

( * ) Notice: Subject to any disclaimer, the term of this patent is extended or adjusted under 35 U.S.C. 154(b) by 409 days.

This patent is subject to a terminal disclaimer.

(21) Appl. No.: 10/462,971

(22) Filed: Jun. 17, 2003

(65) Prior Publication Data

US 2003/0211788 A1 Nov. 13, 2003

Related U.S. Application Data

(60) Division of application No. 09/435,101, filed on Nov. 5, 1999, now Pat. No. 6,599,554, which is a continuation-in-part of application No. 09/368,437, filed on Aug. 4, 1999, now Pat. No. 6,716,472, which is a division of application No. 08/838,217, filed on Apr. 3, 1997, now Pat. No. 5,972,411.

(51) Int. Cl.
*C12C 3/00* (2006.01)
*C12C 3/10* (2006.01)
(52) U.S. Cl. .................. 426/600; 426/52; 426/651; 426/429
(58) Field of Classification Search ................ 426/600, 426/52, 651, 429
See application file for complete search history.

(56) References Cited

U.S. PATENT DOCUMENTS

| 118,396 | A | 8/1871 | Seely |
|---|---|---|---|
| 301,006 | A | 6/1884 | Reihlen |
| 1,464,520 | A | 8/1923 | Von Horst |
| 2,824,803 | A | 2/1958 | Stark |
| 3,044,879 | A | 7/1962 | Koch et al. |
| 3,361,569 | A | 1/1968 | Malick |
| 3,364,265 | A | 1/1968 | Klingel et al. |
| 3,418,135 | A | 12/1968 | Bayne |
| 3,451,821 | A | 6/1969 | Todd, Jr. et al. |
| 4,051,771 | A | 10/1977 | Miyata et al. |
| 4,324,810 | A | 4/1982 | Goldstein et al. |
| 4,759,941 | A | 7/1988 | Chicoye et al. |
| 4,767,640 | A | 8/1988 | Goldstein et al. |
| 5,120,557 | A | 6/1992 | Owades |
| 5,702,737 | A | 12/1997 | Guzinski et al. |
| 5,972,411 | A | 10/1999 | Goldstein et al. |

FOREIGN PATENT DOCUMENTS

| AU | 237071 | 12/1959 |
|---|---|---|
| BE | 753555 | 12/1970 |
| EP | 424756 | 5/1991 |
| GB | 6243 | 5/1885 |
| SU | 158646 | 4/1981 |
| SU | 1495366 | 11/1987 |
| SU | 1601112 | 10/1990 |
| WO | 98/44087 | 10/1998 |

OTHER PUBLICATIONS

N.A. Abbott, et al., "The Contributiion of Hydrolyzed Flavor Precursors to Quality Differences in Shiraz Juice and Wines: An Investigation by Sensory Descriptive Analysis", *Am. J. Enol. Vitic.* 42 (3) 167-174, 1991.

J. Barnett, "The Utilization of Disaccharides and Some Other Sugars by Yeasts", *Advances in Carbohydrate Chemistry and Biochemistry* 39:347-404, 1981.

A. Forster, et al., "Investigations on Hop Polyphenols", Hopfenextraktion HVG Barth, Raiser & Co., Auenstraβe 18—20, 25th EPC Congress, Brussels, 1995.

L. Francis, et al., "Sensory Descriptive Analysis of the Aroma of Hydrolysed Precursor Fractions from Semillon, Chardonnay and Sauvignon Blanc Grape Juices", *J. Sci. Food Agric.* 59:511-520, 1992.

T. Fujita, et al., "Perilloside A, A Monoterpene Glucoside From *Perilla-Frutescens*", *Photochemistry* 31 (9) :3265-3267, 1992.

Y. Fukuoka & M. Kowaka, "Identification of Compounds Imparting Hoppy Flavor to Beer", *Rep. Res. Lab. Kirin Brew. Co.* 26:31-36, 1983.

Y. Gueguen, et al., "A Very Efficient β-Glucosidase Catalyst for the Hydrolysis of Flavor Precursors of Wines and Fruit Juices", *J. Agric. Food Chem.* 44:2336-2340, 1996.

J.G. Guzinski, "Hop Oils", *The New Brewer* pp. 19-21, Jul.-Aug. 1989.

A.J. Irwin, "The Role of Oxygenated Monoterpenes in Kettle Hop Flavour", *Proc. Conv. Inst. Brew.* 20:99-104, 1988.

(Continued)

*Primary Examiner*—Steve Weinstein
*Assistant Examiner*—Adepeju O. Pearse
(74) *Attorney, Agent, or Firm*—Quarles & Brady LLP

(57) ABSTRACT

The isolation of at least one water soluble glycoside comprising an aromatic moiety group conjugated to mono-, di-, and trisaccharides from hop plant parts other than hop cones is disclosed. A glycoside preparation made by extraction of hop plant leaves with an aqueous alcohol was discovered to confer a pleasant grape flavor to the beer to which the glycoside preparation was added. The glycoside composition of the glycoside preparation made from aqueous alcohol-extracted hop plant leaves was found to differ from a similar preparation made from hop cones.

10 Claims, No Drawings

OTHER PUBLICATIONS

V.A. Marinos, et al., "Glucosides of Ethyl Indole-3-lactate and Uroterpenol in Riesling Wine", *Phytochemistry* 31(8): 2755-2759, 1992.

E.M. Martinelli, "Gas-liquid chromatographic and mass spectrometric behaviour of plant glycosides, in the form of trimethylsilyl derivatives", *Eur. J. Mass. Spect. Biochem. Med. & Env. Res.* 1 (1) :33-43, 1980.

I. McMurrough, "High-performance Liquid Chromatography of Flavonoids in Barley and Hops", Elsevier Scientific Publishing Company, Amsterdam, pp. 683-693, 1981.

I. McMurrough & J.A. Delcour, "Wort Polyphenols", *Ferment.* 7 (3) :175-182, 1994.

L. Narziβ, et al., "Routinemäβige Bestimmung von Hopfenölen in Hopfen und Hopfenprodukten soview in Würze und Bier", *Heft* 8:324-330, 1985.

L. Narziβ, et al., "Hopfenölverbindungen und ihr Beitrag zum Hopfenaroma im Bier", *Heft* 10:406-409, 1985.

V. Peacock & M. Deinzer, "Non-bitter Hop Contributions to Beer Flavor", *ACS Symp. Ser.* 170:119-127, 1981.

G. Seeleitner, et al., "Ein Fortschritt in der Hopfenölanalytik", *Heft* 9:367-371, 1985.

L. Narriβ, et al., "Das Verhalten einiger Hopfenaromastoffe während der Würzekochung in Abhängigkeit technologischer Maβnahman", *Heft* 11:448-454, 1985.

R. Tressl, et al. "Gas Chromatographic-Mass Spectrometric Investigation of Hop Aroma Constituents in Beer", *J. Agric. Food Chem.* 26(6) :1422-1425, 1978.

J.E.A. Van Gheluwe, et al., "Hop and Malt Phenolics in Lager Brewing", *J. Inst. Brew.* 85:23-25, 1979.

S.G. Voirin, et al., "Analytical methods for monoterpene glycosides in grape and wine, I. XAD-2 extraction and gas chromatographic-mass spectrometric determination of synthetic glycosides", *J. Chrom.* 590:313-328, 1992.

S.G. Voirin, et al., "Analytical methods for monoterpene glycosides in grape and wine, II. Qualitative and quantitative determination of monoterpene glycosides in grape", *J. Chrom.* 595:269-281, 1992.

P.J. Williams, et al., "Hydrolytic Flavor Release from Non-Volatile Precursors in Fruits, Wines and Some Other Plant-Derived Foods". In *Recent Dev. Flav. Fraq. Chem.*, R. Hopp, et al., Eds., pp. 283-290, 1993.

P. Winterhalter, "Oxgenated $C_{13}$-Norisoprenoids, Important Flavor Precursors", Chapter 9. In *Flavor Precursors, ACS Symposium*, pp. 98-115, 1992.

USE OF GLYCOSIDES EXTRACTED FROM HOP PLANT PARTS TO FLAVOR MALT BEVERAGES

CROSS REFERENCE TO RELATED APPLICATIONS

This application is a divisional of U.S. Ser. No. 09/435,101 filed Nov. 5, 1999, now U.S. Pat. No. 6,599,554 which is a continuation-in-part of U.S. Ser. No. 09/368,437 filed Aug. 4, 1999, now U.S. Pat. No. 6,716,472 which is a divisional of U.S. Ser. No. 08/838,217 filed Apr. 3, 1997, now U.S. Pat. No. 5,972,411.

BACKGROUND OF THE INVENTION

Hops used in brewing mainly add bitterness and impart a hop flavor (e.g., taste and smell) to the final product. Hops derived from the fruit (cones) of hop plants are composed of soft resins, hard resins, hop oils, waxes, lipids, and carbohydrates. The soft resins consist of $\alpha$-acids and $\beta$-acids. The soft resins and a hop oil fraction are extractable by organic solvents, or by liquid and supercritical $CO_2$. In conventional brewing, the $\alpha$-acids are converted into iso-$\alpha$-acids, which are responsible for the bitterness taste. Although there is a lack of consensus as to how best to describe the character of hop flavor in beer, it is universally recognized that the hop flavor (or the kettle hop flavor) is an essential aspect of the total organoleptic impact of beer.

U.S. Ser. No. 08/838,217, now U.S. Pat. No. 5,972,411, which is incorporated by reference herein, disclosed that water soluble glycosides comprising an aromatic compound bonded to a mono-, di-, or trisaccharide may be extracted from hop or hop solids. The hop glycosides thus obtained are precursors to essences and flavorants and can be used to flavor beer. Hydrolysis of the glycosidic bond of the glycosides results in the formation of aglycons and free sugars. It is the volatile aromatic compounds that help confer flavor to beverages such as beer. Conversion of glycosides to their constituent aglycons and sugars can be achieved chemically by acid hydrolysis, enzymatically through the action of specific glycosidases, or fermentatively using whole cell biocatalysts such as yeast. The aromatic aglycons may be added to unhopped beer to impart a flavor after fermentation. The use of these kettle hop essences and flavorants provides economy, efficiency, consistency, flexibility, convenience, and quality to the brewing process.

The isolation of hop glycoside flavor precursors from hop cones as a source of flavorants used as additives to flavor beer was an improvement over the prior art. However, there remains a need for further improvements in the brewing process.

Traditionally, hops used in brewing are derived from the fruit or hop cones of hop plants, and the hop plant leaves and stems are discarded. However, the use of hop cones in brewing has certain disadvantages. The cones of hop plants contain certain hop resins, which can indirectly confer an excessively bitter taste to beer. Derivatives of hop resins are susceptible to degradation upon exposure to light, which results in the formation of compounds that impart an undesirable flavor to beer or similar beverages comprising the compounds. Therefore, beer containing hop resins is susceptible to staling or developing undesirable flavors over time, particularly if the beer is exposed to light.

There is an ongoing interest within the brewing industry to develop new methods that afford improved efficiency, cost savings, and processing advantages over prior art methods, or which yield a product having desirable characteristics, such as improved taste, reduced sensitivity to light, or an extended shelf life.

What is needed in the art is a method of isolating hop glycosides from hop plant parts that are substantially free of resins.

BRIEF SUMMARY OF THE INVENTION

We have discovered that kettle hop flavor essence and flavorant precursors can be isolated from hop plant parts other than hop cones, including hop plant leaves and stems, at acceptable yields and essentially free of hop resins.

One aspect of the invention provides a kettle hop essence and flavorant precursor prepared from hop leaves or stems, and a method of making the precursor preparation, comprising the steps of extracting hop plant leaves or stems with an aqueous alcohol to produce an extract containing polar, water soluble compounds; concentrating the polar, water soluble compounds in the extract; and purifying the kettle hop essence and flavorant precursor in the concentrated extract.

Another aspect of the invention is a kettle hop essence and flavorant preparation, and method of preparing the essence and flavorant preparation from the essence and flavorant precursors of the present invention, the method comprising the step of treating the precursors under conditions suitable to cause hydrolysis of the glycosidic bond between the aglycon and sugar moiety of at least a portion of the glycosides in the precursor.

Optionally, the kettle hop essence and flavorant preparation may be modified by adding to the preparation at least one hop fraction selected from hop oil, iso-$\alpha$-acids, dihydroiso-$\alpha$-acids, tetrahydroiso-$\alpha$-acids, and hexahydroiso-$\alpha$-acids. The kettle hop essence and flavorant preparation may be modified by adding to the preparation a kettle hop essence and flavorant derived from hop cones.

The invention includes a method of making kettle hop flavored beverages using the kettle hop essence and flavorant precursors, and a fermentable growth medium comprising the steps of adding a kettle hop essence and flavorant precursors of the present invention to the medium prior to fermentation.

The present invention includes beverages flavored with a kettle hop essence and flavorant preparation derived from essence and flavorant precursors isolated from hop plant parts other than cones, and methods of making the beverages comprising adding the preparation to the beverage in an amount sufficient to achieve the desired intensity and character of flavor. For beverages prepared from a fermentable growth medium, the flavorant preparation is preferably added after the medium has been fermented.

Optionally, the beverage of the present invention may be prepared using a kettle hop essence and flavorant that has been modified to contain at least one hop fraction selected from hop oil, $\alpha$-acids, iso-$\alpha$-acids, dihydroiso-$\alpha$-acids, tetrahydroiso-$\alpha$-acids, and hexahydroiso-$\alpha$-acids, or a flavorant derived from hop cones.

It is an object of the invention to provide a method that will allow hop plant parts other than hop cones to be used for preparing kettle hop essences and flavorants.

It is a further object of the invention to provide a method of preparing fermented beverages flavored with flavorant precursors extracted from hop plant leaves or stems or kettle hop essences and flavorants prepared by hydrolysing and/or fermenting at least a portion of the glycosides present in the essence and flavorant precursors of the present invention.

It is an advantage of the present invention that the yield of purified kettle hop essences and flavorants per hop plant is increased.

It is a further advantage that the hop stems and leaves from which the essence and flavorant precursors of the present invention are prepared contain essentially none of the resins that can contribute to excessively bitter taste, off flavor, and staling of fermented beverages.

It is a further advantage that kettle hop essence and flavorant precursors to be added into a fermentable beverage media prior to fermentation for preparing fermented beverages.

It is advantageous that by using hop plant leaves and stems the need for extraction of hops with organic solvents or liquid/supercritical $CO_2$ used to remove hop oil and resins is eliminated, which simplifies the purification process.

Another advantage of the invention is that hops essences and flavorants prepared from precursors isolated from hop plant stems and leaves may confer a different desirable flavor to fermented beverages comprising the hops essences and flavorants than are provided by hops essences and flavorants derived from hops cones.

It is a further advantage that the method of the present invention increases the yield of hop flavorant precursor by using leaves and stems that are normally discarded.

Other objects, features, and advantages of the present invention will become apparent from review of the specification, drawings, and claims.

BRIEF DESCRIPTION OF THE DRAWINGS

Not applicable.

DETAILED DESCRIPTION OF THE INVENTION

One wishing to flavor beer by adding the kettle hop essences and flavorants to unhopped beer may first convert at least a portion of the glycosides present in the kettle hop essence and flavorant precursors to aglycons by breaking the attachment of the sugar moiety to the aglycon. Such a converting step can be accomplished by treating the precursor with an enzyme selected for its ability to hydrolyze the glycosidic bond attaching the sugar moiety to the aglycon. As discussed extensively in U.S. Ser. No. 08/838,217, now U.S. Pat. No. 5,972,411, conversion can also be accomplished by fermentation in the presence of yeast and model wort; by fermentation in the presence of yeast and wort; by acid hydrolysis, or by any other suitable method for hydrolyzing glycosidic bonds.

EXAMPLES

Determination of Water Content of Hop Leaves

Frozen fresh Cascade hop leaves were employed. The hop leaf sample contained some stems, but consisted primarily of leaf material.

To determine the dry weight of the leaf material in the frozen fresh hop leaves (FHL), a sample of frozen fresh hop leaves (123.6 g) was dried over time in the lab. The weight of the sample was monitored periodically, and the drying process was allowed to continue until there was almost no further reduction in weight. After about 3 weeks, the sample weighed 41.2 g, or approximately one third of its original wet weight.

Extraction of Frozen Hop Leaves

Frozen fresh hop leaves were extracted as follows: A sample of frozen fresh hop leaves (8.6 kg wet weight, equivalent to 2.9 kg dry hop leaves) was ground using a 4 L capacity blender. For each batch, the blender was filled to 80% capacity and about 1 L of a 80% methanol/20% Millipore water solution was included to obtain a puree. A total of 15 L of the 80% methanol aqueous solution was used to grind and extract the leaves. The purees were pooled and mixed with stirring for 2 h for extraction. Following extraction, the mixture was vacuum filtered using a Buchner funnel and cheesecloth. Solids in the funnel were rinsed with 1 L of 80% methanol aqueous solution and hand pressed until no solution came out. A total of five large Buchner funnels full of the mixture was filtered and pressed, using a total of 20 L 80% methanol solution in the extraction and washing steps. The filtered liquid extract was vacuum filtered using a Buchner funnel and Whatman #541 paper.

A total of 17.025 L of the leaf extract solution was obtained. A 5.9 L portion of this extract (the equivalent of an extract from one kg dry hop leaves) was further processed through the XAD procedure to isolate and concentrate glycosides. Briefly, the extract was stripped of methanol using a Rotovap, and concentrated extract was passed through a column packed with Amberlite XAD-2, and the retained extract was eluted from the column with methanol. The eluted fraction was stripped of methanol to produce the glycoside fraction. The glycoside fraction was contained in a 600 ml volume. A 100 ml portion of the fresh hop leaves glycoside fraction was freeze dried to yield 1.08 g solid material.

HPLC glycosyl-glucose analysis was performed on the extract to estimate glycoside concentration and derivatized GC/MS was performed on the freeze-dried (FD) material to determine glycoside constituents. Both methods used established procedures.

Two sets of fermentation experiments (with or without sugar) were performed using the freeze dried XAD concentrate of fresh hop leaves to evaluate flavor development.

Fermentation in Model Wort Buffer Without Sugar

1. Fresh hop leaf (XAD freeze dried material (0.4 mg/ml); model wort buffer and yeast (100 million cells/ml).

2. Control—model wort buffer+yeast (100 million cells/ml)

3. Control—buffer only

Fermentation reactions 1–3 were conducted at 15° C. with aeration by shaking for 3 days.

Fermentation in Model Wort Buffer With Glucose

4. Fresh hop leaf XAD freeze dried material (0.4 mg/ml); glucose (0.11 g/ml); model wort buffer; and yeast (12 million cells/ml).

5. Control—glucose (0.11 g/ml); model wort buffer; and yeast (12 million cells/ml)

Fermentation reactions 4–5 were conducted at 15° C. for 7 days with aeration.

One liter of model wort buffer contains the following components in 1 L of Millipore water:

| | |
|---|---|
| $KH_2PO$ | 1.03 g |
| $CaSO_4 \cdot 2H_2O$ | 0.31 g |
| $MgCl2.6\ H_2O$ | 1.41 g |
| NaCl | 0.11 g |
| $(NH4)_2SO_4$ | 1.79 g |

For volatile analysis the above fermentation samples were extracted by a C18 cartridge extraction method and analyzed by GC/MSD.

RESULTS

The results of HPLC glycosyl-glucose analysis are as shown in Table 1. Results obtained using Galena hop solids (solid residues remaining after extraction of hop cones or pellets with liquid/supercritical CO2 or a nonpolar organic solvent) are shown for purposes of comparison. Based on HPLC glycosyl-glucose analysis, fresh hop leaves contained a far smaller quantity of glycosides than hop solids.

TABLE 1

| Samples | Free gluc g/Kg* | Total gluc g/Kg* | Glyc-gluc g/Kg* |
| --- | --- | --- | --- |
| Cascade FHL | 0.4 | 0.5 | 0.1 |
| Galena hop solids | 0 | 2.7 | 2.7 |

*g/Kg of equivalent dry hop leaves or CDH

Table 2 shows ion intensities (as determined by the mass fragment peak area count of TFA derivatized GC/MS analysis) of selected glycosides in Cascade FHL and Mt. Hood hop solids.

TABLE 2

| Compounds | Cascade FHL | Mt. Hood hop solids |
| --- | --- | --- |
| 3-methyl butanol glucose 4TFA | 449940 | 139964 |
| Benzyl alcohol glucose 4TFA | 15342336 | 964657 |
| 2-phenyl ethanol glucose 4TFA | 6534319 | 288187 |
| 1-octanol glucose 4TFA | 0 | 73348 |
| Vanillin glucose 4TFA | 245462 | 127699 |
| Linalol glucose 4 TFA | 59055 | 44698 |
| Alpha-terpineol glucose 4TFA | 21451 | 277018 |
| TOTAL | 22652533 | 1915571 |

It is interesting to note that there are significant differences in the compositions of glycosides between FHL and hop solids. For example, benzyl alcohol glycoside is present in a very high concentration in FHL, whereas octanol glycoside was undetectable, and based on TFA derivatized GC/MS analysis, the concentration of total glycosides was greater in fresh leaves than in the spent cones.

Aroma Evaluation Results of the Fermented Samples

The results of aroma evaluations, conducted by five people, are summarized in Tables 3 and 4.

TABLE 3

| Wort buffer | Aroma Evaluation |
| --- | --- |
| 1. FHL XAD FD + buffer + yeast | Intense fruity aroma, strong grape or grape soda, beer aroma, very fruity, the best of three |
| 2. Control – buffer + yeast | Fruity, yeasty, off-aroma |
| 3. Control – buffer only | Green dried hay, grassy, hop leaf extract aroma |

TABLE 4

| Wort buffer + glucose | Aroma Evaluation |
| --- | --- |
| 4. FHL XAD FD + sugar + buffer + yeast | Very fruity, pleasant, strong grape sweet aroma, grape aroma may not be strong as #1 sample, tasted same as #5 control but with grape flavor, no bitter taste |
| 5. Control – sugar + buffer + yeast | Fermented model wort aroma, winey and yeasty, tasted same as #4 without any grape flavor |

Fermentations 1 and 4 produced a very pleasant, strong, sweet grape aroma. The intensity of this aroma seemed to be stronger in the sample without sugar (#1), where yeast was forced to metabolize FHL XAD FD. There was no bitter taste imparted by FHL XAD FD in the sample #4 (sample #1 was not tasted) as is typically found in samples prepared with the hop glycosides derived from hop solids.

Extracts prepared from FHL have significantly different glycoside compositions than those prepared from hop solids. An important distinction between fermentation products using FHL or hop solids are that inclusion of FHL in fermentation results in a product having a very intense, pleasant grape aroma; in contrast, no such grape aroma is produced by fermentations including hop solids. At present, the compound responsible for the intense grape aroma has not been unequivocally established.

Another important finding is that FHL does not impart a bitter taste that is characteristic of the glycosides from hop solids.

The present invention is not limited to the exemplified embodiments, but is intended to encompass all such modifications and variations as come within the scope of the following claims.

We claim:

1. A method for preparing a hop essence and flavorant comprising:
   (a) extracting a hop plant part other than hop cones with an aqueous alcohol to produce an extract containing hop essence and flavorant precursors;
   (b) concentrating the hop essence and flavorant precursors in the extract;
   (c) purifying the concentrated extract by removing at least a portion of free carbohydrates and inorganic salts to obtain a purified kettle hop essence and flavorant precursor; and
   (d) converting at least some of the glycosides in the purified hop essence and flavorant precursor to aglycons by breaking the glycosidic bond between the aglycon moiety and the sugar moiety thereby producing a hop essence and flavorant
   wherein the purifying step is accomplished by the steps of:
   (i) feeding the extract to a liquid chromatography column having a packing material selected from the group consisting of polymeric resins, activated carbon, molecular sieves, silica gels, derivatized silica gels, celluloses, and derivatized celluloses whereby at least one kettle hop essence or flavorant precursor is retained on the packing material,
   (ii) eluting the kettle hop essence or flavorant precursors from the packing material to obtain an eluent containing kettle hop essence or flavorant precursors, and
   (iii) further concentrating the kettle hop essence or flavorant precursors in the eluent by evaporation.

2. The method of claim 1, wherein the hop plant part is selected from the group consisting of leaves and stems.

3. The method of claim 2, wherein the hop plant part is leaves selected from the group consisting of fresh leaves, frozen leaves, dried leaves, and spent leaves.

4. The method of claim 1, further comprising adding at least one hop fraction selected from the group consisting of hop oil, iso-α-acids, dihydroiso-α-acids, tetrahydroiso-α-acids, and hexahydroiso-α-acids, a hop cone essence and flavorant, or hop cone essence and flavorant precursors after converting at least some of the glycosides in the purified hop essence and flavorant precursor.

5. The method of claim 1, wherein the breaking of the glycosidic bond of the glycosides in the precursors is correlated with the development of a grape flavor.

6. The method of claim 1, wherein the converting step is catalyzed by an enzyme capable of catalyzing the disruption of the glycosidic bond.

7. The method of claim 1, wherein the converting step is accomplished by fermentation in the presence of yeast and model wart buffer.

8. The method of claim 7, wherein the wort buffer further comprises at least one sugar.

9. The method of claim 1, wherein the converting step is performed by adding the precursor to a fermentation comprising yeast and wort prior to fermentation.

10. The method of claim 1, wherein the converting step is accomplished by acid hydrolysis.

* * * * *